United States Patent [19]

Miura

[11] Patent Number: 6,093,505
[45] Date of Patent: Jul. 25, 2000

[54] CATHODE MATERIAL AND NON-AQUEOUS ELECTROLYTE SECONDARY CELL USING THE CATHODE MATERIAL

[75] Inventor: Kaoru Miura, Kanagawa, Japan

[73] Assignee: Sony Corporation, Tokyo, Japan

[21] Appl. No.: 09/085,110

[22] Filed: May 28, 1998

[30] Foreign Application Priority Data

May 29, 1997 [JP] Japan .................................... 9-140594

[51] Int. Cl.$^7$ .............................. H01M 4/58; H01M 4/50
[52] U.S. Cl. .................. 429/218.1; 429/224; 429/231.95
[58] Field of Search .............................. 429/224, 231.95, 429/218.1

[56] References Cited

U.S. PATENT DOCUMENTS 5,449,577  9/1995  Dahn et al. ................................ 429/94

*Primary Examiner*—Laura Weiner
*Attorney, Agent, or Firm*—Hill & Simpson

[57] ABSTRACT

The present invention provides a cathode material for a lithium ion secondary cell having an excellent voltage characteristic and enabling to obtain a high capacity cell although cheaper than $LiCoO_2$.

The present invention uses as a cathode material a lithium compound $Li_xMn_2O_4$ (wherein x is in the range of $0 \leq x \leq 3$) whose oxygen ions are at least partially replaced by negative ions having a greater absolute value of valence than oxygen ion. Such a lithium compound may be, for example, $Li_xMn_2O_2N_2$.

5 Claims, 6 Drawing Sheets

CATHODE MATERIAL AND NON-AQUEOUS ELECTROLYTE SECONDARY CELL USING THE CATHODE MATERIAL

BACKGROUND OF THE INVENTION

1. Field of the Invention

The present invention relates to a cathode material and a non-aqueous electrolyte secondary cell using the cathode material an in particular, to improvement of electric characteristic.

2. Description of the Prior Art

Recently, among chargeable cells, a spotlight is put on a so-called lithium ion secondary cell (non-aqueous electrolyte secondary cell) which repeats charge and discharge by movement of lithium ions and electrons between a positive and a negative electrode, as a cell showing a high voltage characteristic in the order of 4 V.

The lithium ion secondary cell normally uses lithium cobalt oxide ($Li_xCoO_2$, wherein $0 \leq x \leq 1$) for the positive electrode and carbon or graphite for the negative electrode. In such a secondary cell, charge and discharge are carried out by lithium ions which are inserted into and taken out from between layers of the layered compound constituting the positive and negative electrodes.

This $Li_xCoO_2$ used for the positive electrode is an excellent material exhibiting a high voltage characteristic of 4 V or above and having structure which is maintained comparatively stable for the insert and taken out of lithium ions. However, cobalt is not easily available and costs too much. For this, it is necessary to develop a positive electrode (cathode) material to replace $Li_xCoO_2$ without using cobalt.

As a cathode material not containing cobalt, there can be considered lithium nickel oxide of layered structure ($Li_xNiO_2$, wherein $0 \leq x \leq 1$) and lithium manganate ($LiMn_2O_4$) of spinel structure into which or from which lithium ions and electrons are inserted or taken out to obtain $Li_xMn_2O_4$ ($0 \leq x \leq 3$). There materials are already used in a part of products. Especially, $Li_xMn_2O_4$ attracts a great attention because manganese is rich as a resource compared to cobalt as well as nickel and costs less.

However, this $Li_xMn_2O_4$ has a problem in the electric characteristic.

That is, the value x in $Li_xMn_2O_4$ is logically in the range of $0 \leq x \leq 3$ but because of the structure stability, it is considered to be more appropriate to use the range of $0 \leq x \leq 2$.

However, when $Li_xMn_2O_4$ ($0 \leq x \leq 2$) is used for the cathode of the lithium ion secondary cell, the voltage characteristic obtained is shown in FIG. 2. Although in the range of $0 \leq x \leq 1$ it is possible to obtain a high voltage characteristic of 4 V or above, the voltage suddenly drops in the vicinity of x=1, and in the range of $1 \leq x \leq 2$, a voltage characteristic in the order of only 3 V can be obtained. (Hereinafter, the range enabling to obtain a voltage characteristic of 4 V or above will be referred to as a 4 V region; and the range enabling to obtain only 3 V or so will be referred to as a 3 V region.)

That is, the 4 V region of the $Li_xMn_2O_4$ ($0 \leq x \leq 2$) is only about 50% of the logical capacity of $Li_xCoO_2$ ($0 \leq x \leq 1$). However, it should be noted that the manganate ($Mn_2O_4$) of $Li_xMn_2O_4$ of the spinel structure has a more stable skeleton than the $Li_xCoO_2$ of the layered structure, and enables to take out sufficient lithium ions. Actually, the $Li_xMn_2O_4$ enables to obtain a capacity of about 80% of the case using $Li_xCoO_2$. However, in order to obtain a capacity competing with $Li_xCoO_2$, the 4 V region of the $Li_xMn_2O_4$ should be further extended.

SUMMARY OF THE INVENTION

It is therefore an object of the present invention to provide a cathode material made from a lithium manganese compound, having an extended 4 V region, and capable of giving a high capacity to a cell as well as a non-aqueous electrolyte secondary cell using the cathode material.

In order to achieve the aforementioned object, the cathode material according to the present invention includes a lithium compound $Li_xMn_2O_4$ (wherein x is in the range of $0 \leq x \leq 3$) whose oxygen ions are at least partially replaced by negative ions having a greater absolute value of valence than oxygen ions.

Moreover, the non-aqueous electrolyte secondary cell according to the present invention uses a cathode made from a lithium compound $Li_xMn_2O_4$ (wherein x is in the range of $0 \leq x \leq 3$) whose oxygen ions are at least partially replaced by negative ions having a greater absolute value of valence than oxygen ions.

The Mn ion valence of $Li_xMn_2O_4$ is $Mn^{4+}$ when x=0, $Mn^{3.5+}$ when x=1, and $Mn^{3+}$ when x=2. That is, when Li is inserted into $Li_xMn_2O_4$ in the range of $0 \leq x \leq 2$, the Mn ion is changed from $Mn^{4+}$ to $Mn^{3+}$.

Here, the Mn ion of $Li_xMn_2O_4$ in the 3d orbit is separated into triple degeneration and double degeneration. The triple degeneration has a lower energy potential than double degeneration.

The $Mn^{4+}$ in the state having three electrons in this triple degeneration, and $Mn^{3+}$ is in the state having three electrons in the triple degeneration, and one electron in the double degeneration. When $Mn^{4+}$ is changed to $Mn^{3+}$, an electron is inserted to the double degeneration. For this, in the change from $Mn^{4+}$ to $Mn^{3+}$, the Fermi level $E_F$ is greatly increased for the energy gap between the triple degeneration and the double degeneration, which in turn greatly decreases the voltage. For this, when $Li_xMn_2O_4$ is used as the cathode material, only voltage of 3 V or so can be obtained in the Li range of $1 \leq x \leq 2$.

In contrast to this, in the lithium compound $Li_xMn_2O_4$ (wherein x is in the range of $0 \leq x \leq 3$) whose oxygen ions are at least partially replaced by negative ions having a greater absolute value of valence than oxygen ions, when Li is inserted in the range of $0 \leq x \leq 2$, the Mn ion having a valence greater than $Mn^{4+}$ is changed to a Mn ion having a valence smaller by 1 (for example, if the negative ion to replace oxygen is a nitrogen ion, $Mn^{5+}$ is changed to $Mn^{4+}$). In such a valence change, the electron in the 3d orbit enters triple degeneration and accordingly, in comparison to the change from $Mn^{4+}$ to $Mn^{3+}$, for the energy gap between the triple degeneration and double degeneration, the Fermi level $E_F$ increase is slowed down. For this, the voltage decrease is reduced. Besides, the number of electrons existing in the triple degeneration is reduced, lowering the energy level, which in turn increases the voltage as a whole and extends the 4 V region.

DETAILED DESCRIPTION OF PREFERRED EMBODIMENTS

Hereinafter, the description will be directed to embodiments of the present invention with reference to the attached drawings.

$LiMn_2O_4$ is a lithium composite oxide of spinel structure. When it is used as a cell cathode material, charge and discharge are accompanied by insertion or taking out of lithium ions and electrons. That is, the material can be expressed as $Li_xMn_2O_4$ wherein the Li atomic ratio x changes in the range of $0 \leq x \leq 3$. However, because of the structure stability, the range of $0 \leq x \leq 2$ is used in practice.

The present invention provides as a cathode material, a lithium compound $Li_xMn_2O_4$ whose oxygen ions are at least partially replaced by negative ions having a greater absolute value than the oxygen ion. This lithium compound enables an obtaining of a greater 4 V region in the voltage characteristic in comparison to the $Li_xMn_2O_4$. Hereinafter, the reason for this will be explained according to the electron theory.

Firstly, the open circuit voltage $V_{oc}$ (unit: volt) which appears in the voltage characteristic of a cell can be expressed as follows.

$$V_{oc} = (\Phi c - \Phi a) \qquad \text{Equation 1}$$

$\Phi c$: Cathode work function (eV)
$\Phi a$: Anode work function (eV)
e: Electric charge ($=1.6 \times 10^{-19}$ coulomb)

That is, the voltage $V_{oc}$ of the voltage characteristic is a value proportional to a difference of the cathode and the anode work functions.

Here, the work function is expressed as an energy size from a vacuum level to a Fermi level $E_F$ and accordingly, a change of the Fermi level $E_F$ corresponds to a change of the voltage characteristic. Consequently, if it is assumed that the anode work function is a constant, a higher voltage can be obtained as the cathode function increases, in other words as the cathode Fermi level $E_F$ decreases.

Next, the voltage characteristic of $Li_xMn_2O_4$ ($0 \leq x \leq 2$) will be studied from the viewpoint of the Fermi level EF.

Firstly, in the case of $Li_xMn_2O_4$ ($0 \leq x \leq 2$), the average Mn ion valence is as follows, assuming that the lithium valence is 1+ and the oxygen valence is 2–: $Mn^{4+}$ when x=0; $Mn^{3.5+}$ when x=1; and $Mn^{3+}$ when x=2. The $Li_xMn_2O_4$ has a voltage characteristic which can be inferred from the respective Fermi levels $E_F$ of $Mn^{4+}$, $Mn^{3.5+}$, and $Mn^{3+}$.

Figure 1:
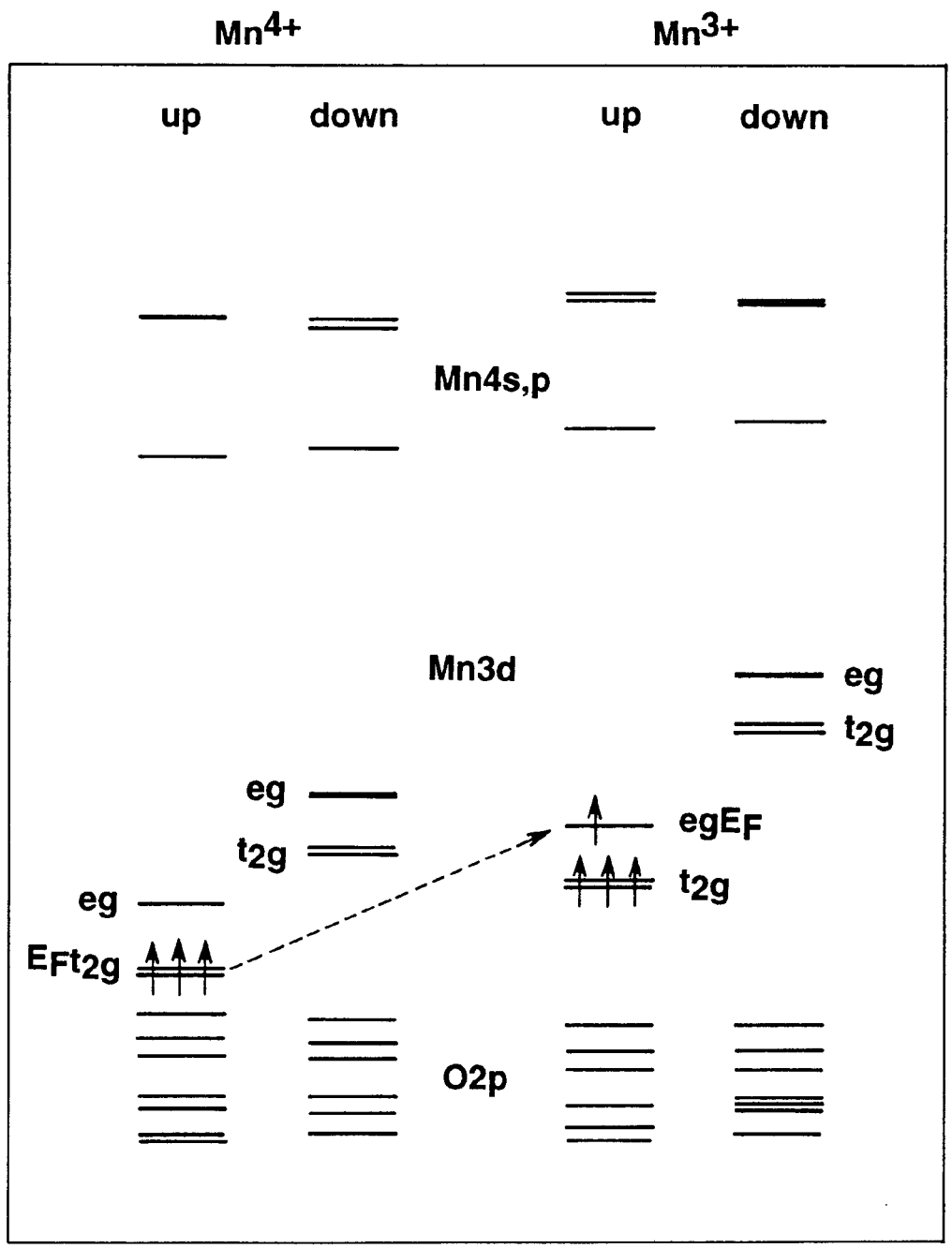
FIG. 1 schematically shows $Mn^{4+}$ and $Mn^{3+}$ electron states calculated by using the $MnO_6^{n-}$ model.

Here, FIG. 1 shows results of calculation of the Fermi levels $E_F$ of $Mn^{4+}$ and $Mn^{3+}$ with simplified models of a $MnO_6{}^{8-}$ octahedron ($Mn^{4+}$) and a $MnO_6{}^{9-}$ octahedron ($Mn^{3+}$). It should be noted that this FIG. 1 also shows electron energy levels together with the Fermi levels $E_F$. Moreover, although not shown in FIG. 1, the Fermi level $E_F$ of the $MnO_6{}^{8.5-}$ ($Mn^{3.5+}$) is in the intermediate energy state between these. Consequently, it can be inferred that as the $Mn^{4+}$ changes into the $Mn^{3+}$, the Fermi level is slowly increased and the voltage is slowly lowered.

Figure 2:
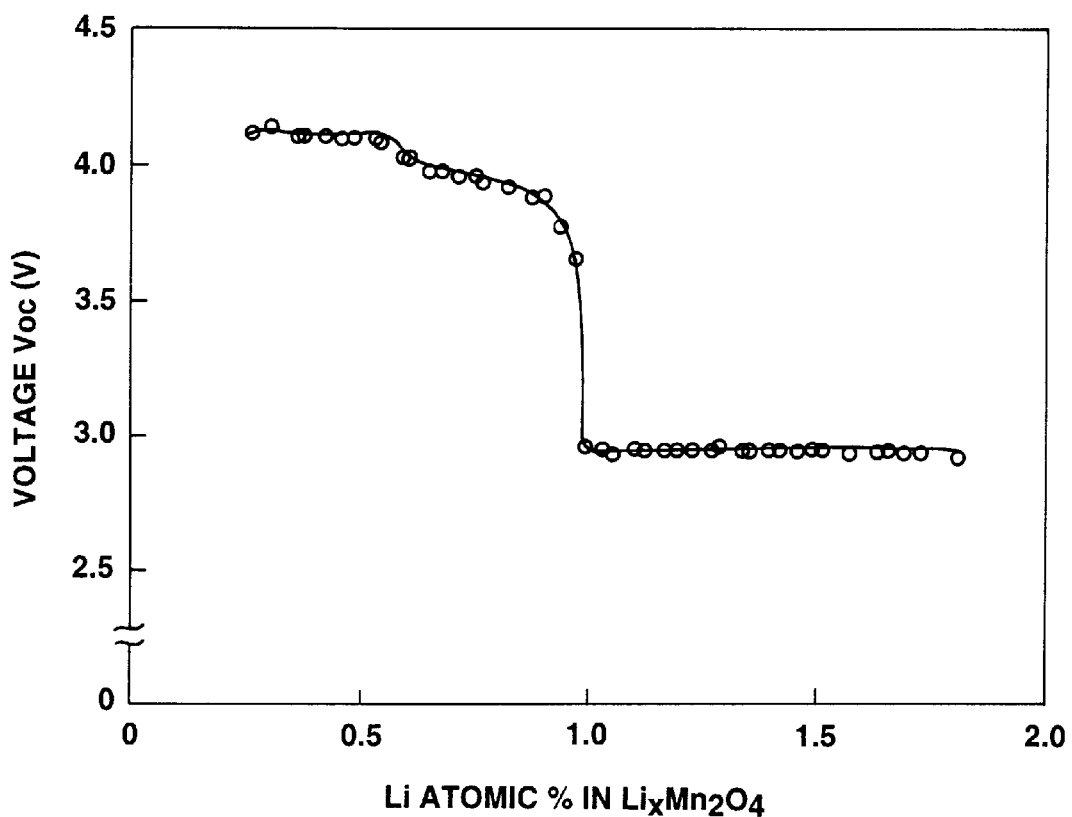
FIG. 2 shows a voltage characteristic of a lithium ion secondary cell using $Li_xMn_2O_4$ as the cathode material.

In contrast to this, FIG. 2 shows actual measurements of a voltage characteristic of a non-aqueous electrolyte secondary cell using $Li_xMn_2O_4$ as the cathode material. The $Li_xMn_2O_4$ ($0 \leq x \leq 2$) shows a voltage characteristic in which voltage is slowly lowered in the range of $0 \leq x \leq 1$, suddenly lowered at x=1, and stays constant in the range of $1 \leq x \leq 2$. That is, the voltage characteristic obtained in the experiment is different from the voltage characteristic which is inferred from the model of $MnO_6{}^{n-}$.

The reason why $Li_xMn_2O_4$ has a voltage characteristic which is different from the voltage characteristic inferred from the $MnO_6{}^{n-}$ model and abruptly decreases at x=1 is considered to be that the $Li_xMn_2O_4$ changes from a single phase into two phases at x=1.

Figure 3:
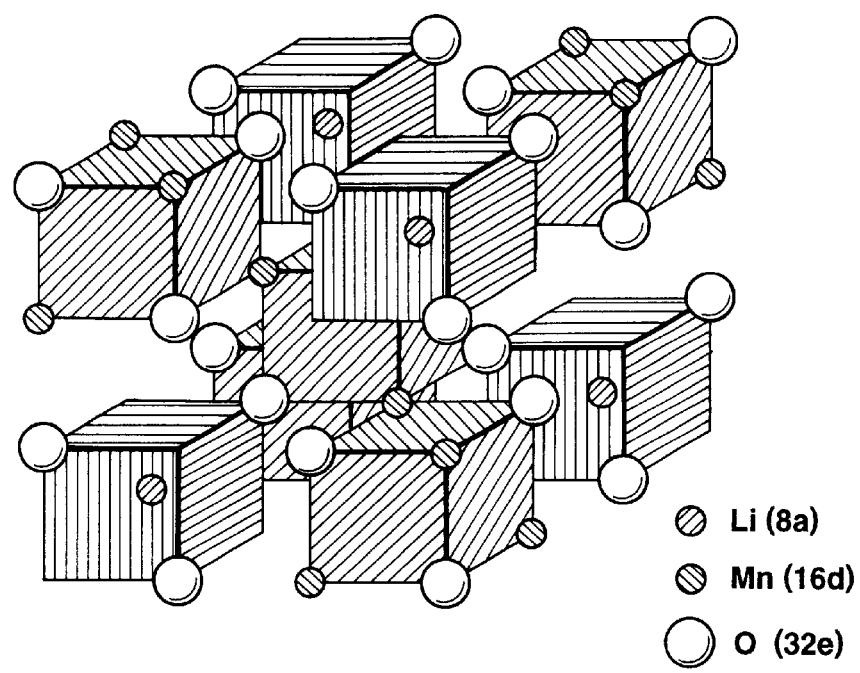
FIG. 3 schematically shows a crystalline structure of $LiMn_2O_4$.

FIG. 3 shows $LiMn_2O_4$ of spinel structure. When the $Li_xMn_2O_4$ has the x in the range of $0 \leq x \leq 1$, a lithium ion is inserted to the site 8a of this spinel structure. By the lithium ion inserted to this site, as show in FIG. 2, the cell voltage is slowly reduced in the range of $0 \leq x \leq 1$ of lithium.

On the other hand, when the x is in the range of $1 \leq x 2$, a lithium ion is inserted into the site 16c which is not occupied by an atom (ion). However, it is experimentally known that the $Li_xMn_2O_4$ changes from a single phase into two phases at the boundary of x=1. That is, there is obtained a structure where the phase of the $LiMn_2O_4$ (average Mn valence: 3.5+) exists together with the phase of the $Li_2Mn_2O_4$ (average Mn valence: 3+).

In this case, lithium ions and electrons entering the cathode are considered to enter the $LiMn_2O_4$ side constituting the phase boundary, so as to change into $Li_2Mn_2O_4$. For this, in the range of $1 \leq x \leq 2$, slight change of x causes only the change of ratio between the $LiMn_2O_4$ phase and the $Li_2Mn_2O_4$ phase, shifting the phase boundary.

In the cathode material thus containing the $LiMn_2O_4$ phase together with the $Li_2Mn_2O_4$ phase, the voltage is determined by the local electron state at the phase boundary, i.e., the Fermi level $E_F$ of the $Li_2Mn_2O_4$, and the voltage remains constant regardless of the position of the phase boundary. Consequently, in the range of $1 \leq x \leq 2$ where only the phase boundary is shifted, as shown in FIG. 2, the voltage is abruptly decreased down to the voltage determined by the Fermi level EF of the $Li_2Mn_2O_4$ at x=1 and the voltage remains unchanged if the x is further increased.

Figure 4:
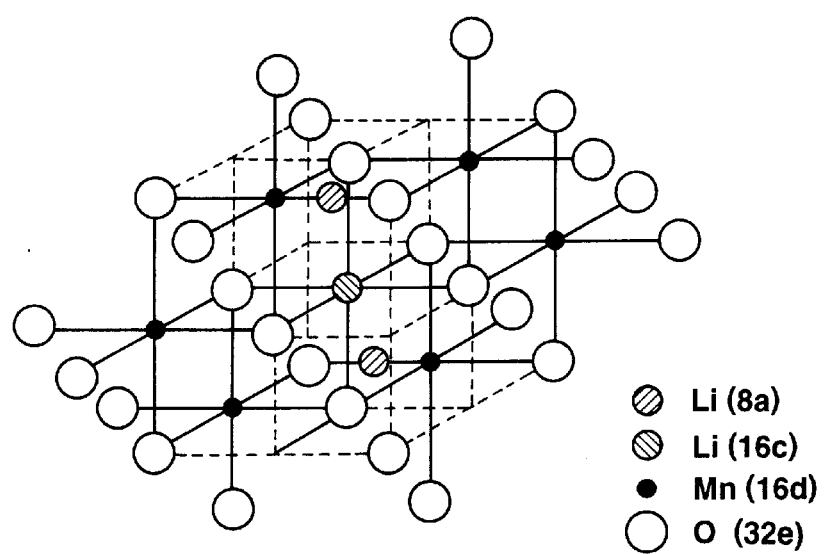
FIG. 4 schematically shows a cluster model of $Li_yMn_6O_{26}{}^{n-}$.

However, in order to quantitatively obtain the voltage characteristic reflecting such a phase change by way of calculation, there is a difficulty with the aforementioned small model of $MnO_6{}^{n-}$. Here, as the cluster model for calculating the voltage characteristic, $Li_yMn_6O_{26}{}^{n-}$ is used. This cluster model accurately reflects the Mn 3d orbit and as shown in FIG. 4, has six $MnO_6$ octahedrons and three sites (two 8a sites and one 16c site) for lithium insertion. In this model, the case of $Mn_6O_{26}{}^{28-}$ corresponds to the $Mn_2O_4$ ($Mn^{4+}$) electron state; the case of $Li_2Mn_6O_{26}{}^{29-}$ corresponds to the $LiMn_2O_4$ ($Mn^{3.5+}$) electron states; and the case of $Li_3Mn_6O_{26}{}^{31-}$ corresponds to $Li_xMn_2O_4$ ($1 \leq x \leq 2$, $Mn^{3+}$).

Figure 5:
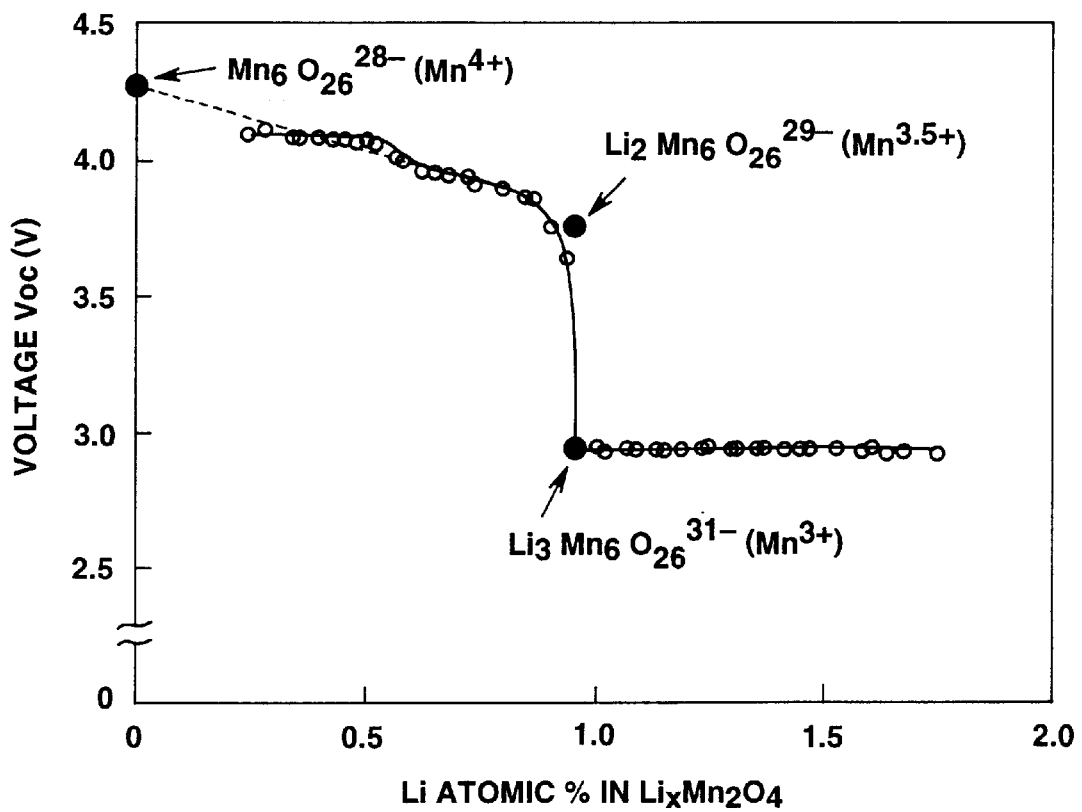
FIG. 5 shows a voltage characteristic obtained by using the $Li_yMn_6O_{26}{}^{n-}$ cluster model together with a voltage characteristic of a lithium ion secondary cell using $Li_xMn_2O_4$ as the cathode material.

By using the Fermi level $E_F$ of such a $Li_yMn_6O_{26}{}^{n-}$ model, the voltage characteristic obtained from the aforementioned Equation 1 is show in FIG. 5 together with the voltage characteristic of $Li_xMn_2O_4$ of FIG. 2. Thus, the calculation results are quite matched with the experiment results. From this, it can be understood that by using the $Li_yMn_6O_{26}{}^{n-}$, it is possible to obtain the voltage characteristic of $Li_xMn_2O_4$ electron-theoretically.

Note that FIG. 5 shows that a voltage decrease in the range of $0 \leq x \leq 1$ is 0.52 V, and the sudden voltage decrease at x=1 is 0.84V. The difference 0.32 V between these voltage decreases is considered to be that the electron energy is changed by the potential generated by the lithium ion inserted into this 16c site.

In order to extend the 4 V region in the voltage characteristic, it is necessary to suppress the rapid decrease of voltage at x=1. For this, it is helpful that the oxygen ions of $Li_xMn_2O_4$ are partially or entirely replaced by negative ions having a greater absolute valence value than the oxygen ions, so that when a lithium ion is inserted, a Mn ion having a valence greater than $Mn^{4+}$ is changed into an Mn ion having a valence smaller than 1. The reason will be explained below.

In the case of $MnO_6{}^{n-}$ wherein distances between the manganese ions and anions (here, oxygen ions) coordinated there are all identical, the 3d orbit of the quintet-degenerated Mn is separated into a triple degeneration called $t_{2g}$ and a double degeneration called $e_g$. Compared to $e_g$, the $t_{2g}$ has a lower energy potential.

As shown in the aforementioned FIG. 1, the $Mn^{4+}$ is in the up spin state of $t_{2g}$ having three electrons; and the $Mn^{3+}$ is in the up spin state of $t_{2g}$ having three electrons and the up spin state of $e_g$ having one electron. When the $Mn^{4+}$ is changed into $Mn^{3+}$, one electron is inserted into the $e_g$. For this, in the change from $Mn^{4+}$ to $Mn^{3+}$, the Fermi level $E_F$ is significantly increased for the energy gap between the triple degeneration and the double degeneration, which causes lowering of the voltage.

Figure 6:
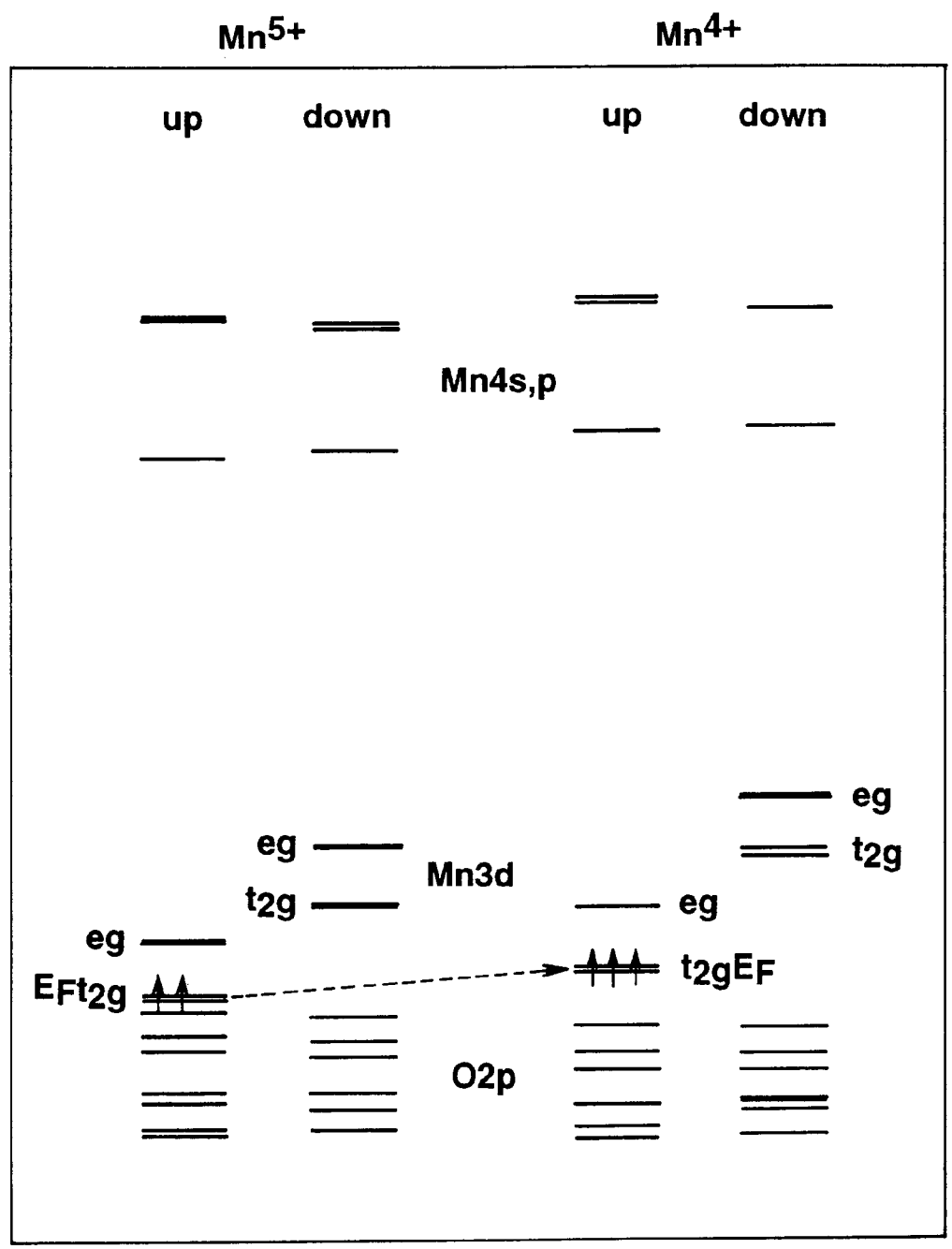
FIG. 6 schematically shows $Mn^{5+}$ and $Mn^{4+}$ electron states calculated by using the $MnO_6{}^{n-}$ model.

On the other hand, FIG. 6 shows electron states of $Mn^{5+}$ and $Mn^{4+}$. The $Mn^{5+}$ is the up spin state of $t_{2g}$ having two electrons; and $Mn^{4+}$ is the up spin state of $t_{2g}$ having three electrons. When the $Mn^{5+}$ is changed into $Mn^{4+}$, one electron is inserted to $t_{2g}$. In this case, as there is no energy gap, the Fermi level $E_F$ is slowly increased and the voltage lowering is small. Besides that, the number of electrons existing in $t_{2g}$ is decreased, which in turn lowers the energy level. Consequently, the voltage characteristic when $Mn^{5+}$ is changed to $Mn^{4+}$, is at a higher value as a whole in comparison to the voltage characteristic at the change from $Nn^{4+}$ to $Mn^{3+}$. Furthermore, the energy level of triple degeneration in which an electron is inserted during discharge is also lowered, which greatly improves the voltage characteristic.

From these reasons, in order to extend the 4 V region, it is more advantageous to use the change from $Mn^{5+}$ to $Mn^{4+}$ than the change from $Mn^{4+}$ to $Mn^{3+}$. However, in this case also, it is impossible to make zero the voltage decrease at x=1 because as has been described above, there is 0.32 V caused by the energy change from the potential generated by the lithium ion at x=1.

In order to obtain the change from $Mn^{5+}$ to $Mn^{4+}$, it is necessary to create the $Mn^{5+}$ state. The $Mn^{5+}$ can be established by decreasing the anion (oxygen ion) valence smaller than −2. Consequently, with the $Li_xMn_2O_4$ having the oxygen ion valence as −2, it is impossible to create the $Mn^{5+}$ stated.

To cope with this, the present invention, in order to establish a valence greater than $Mn^{4+}$, uses as a cathode material a lithium compound $Li_xMn_2O_4$ whose oxygen ions are replaced by negative ions having an absolute value of valence greater than the oxygen ions. In this case, if the lithium is inserted in the range of $0 \leq x \leq 2$, the Mn ion of a greater valence than $Mn^{4+}$ is changed into an Mn ion having a valence smaller by 1 ( for example, if the negative ion to replace the oxygen is a nitrogen ion, $Mn^{5+}$ is changed to $Mn^{4+}$). Consequently, in comparison to the $Li_xMn_2O_4$ in which the Mn valence is changed from 4+ to 3+, it is possible to obtain a higher voltage as a whole and to suppress the sudden voltage decrease at x=1.

As the negative ion to replace oxygen, there can be exemplified a nitrogen (N) ion and a phosphorous (P) ion. The cathode material according to the present invention is $Li_xMn_2O_4$ whose oxygen ions are at least partially replaced by such negative ions. However, from the viewpoint of the voltage characteristic, the replacement quantity by this negative ions is preferably in the range of 50 atomic % or below, assuming 100 atomic % of the oxygen ion quantity prior to replacement.

Explanation will be given on a specific example of $Li_xMn_2O_4$ in which 50 atomic % of oxygen ion is replaced by nitrogen ion as $Li_xMn_2O_2N_2$.

Figure 7:
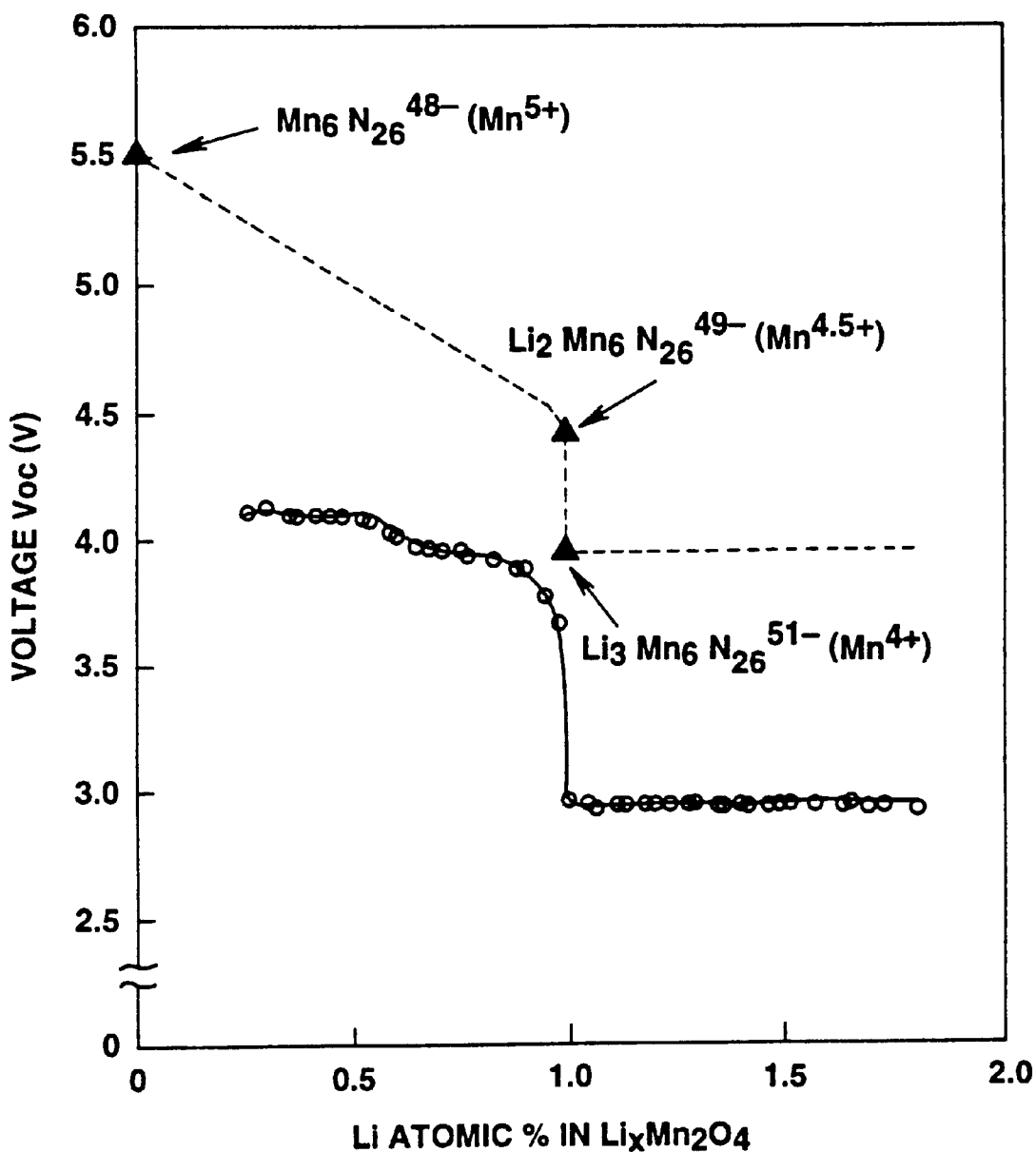
FIG. 7 shows a voltage characteristic obtained by using $Mn_6N_{26}{}^{48-}(Mn^{5+})$, $Li_2Mn_6N_{26}{}^{49-}(Mn^{4.5+})$ and $Li_3Mn_6N_{26}{}^{51-}(Mn^{4+})$ in comparison to a voltage characteristic of a lithium ion secondary cell using $Li_xMn_2O_4$ as the cathode material.

In this $Li_xMn_2O_2N_2$, it is possible to obtain $Mn^{5+}$ when x=0, $Mn^{4.5+}$ when x=1, $Mn^{4+}$ when x=2. FIG. 7 shows a voltage characteristic obtained from Equation 1 by using a cluster model of $Li_yMn_2N_{26}{}^{-n}$. It should be noted that here it is assumed that the lithium ion valence is 1+, and the nitrogen ion valence is 3−. In this cluster model, $Mn_6N_{26}{}^{48-}$ corresponds to $Mn_2O_2(Mn^{5+})$; $Li_2Mn_6N_{26}{}^{49-}$ corresponds to $LiMn_2O_2$ ($Mn^{4.5+}$) ; and $Li_3Mn_6N_{26}{}^{51-}$ corresponds to $Li_xMn_2O_2N_2$ ($1 \leq x \leq 2$, $Mn^{4+}$). Moreover, FIG. 7 also shows the voltage characteristic of $Li_xMn_2O_4$.

As shown in FIG. 7, the voltage is 5.53 V when Mn6N2648−; 4.39 V when $Li_2Mn_6N_{26}{}^{49-}$; and 3.96 V when $Li_3Mn_6N_{26}{}^{51-}$. Thus, it is possible to obtain a higher voltage characteristic as a whole compared to $Li_xMn_2O_4$, and to suppress the abrupt voltage decrease at x=1. As a result, it is possible to obtain a voltage of 4 V or above in the range of $0 \leq x \leq 2$.

The aforementioned lithium compound having oxygen ions replaced can be synthesized by an ordinary solid phase reaction. That is, a lithium salt, a manganese salt, and a salt of negative ions to replace oxygen ions are mixed as raw materials with a predetermined mol ratio and the mixture is baked in an oxygen stream.

As specific examples, synthesis of $LiMnO_2N_2$ and synthesis of $LiMn_2O_2P_2$ will be explained below.

Synthesis of $LiMn_2O_2N_2$

Lithium carbonate ($Li_xCO_3$), manganese oxide ($Mn_2O_3$), manganese nitride ($Mn_6N_5$), and manganese salt of hexacyanomanganese complex ($Mn_2[Mn(CN)_6]$) are mixed at a ratio of 4:2:1:2 and treated for 12 hours or so in ethanol by a ball mill. After this, this mixture is dried in air at a temperature of 70° C., and then subjected to a temporary baking in an oxygen stream of 500 cc/min at a temperature of 700° C. for 10 hours. After this, the mixture is subjected to a main baking in an oxygen stream of 500 cc/min at a temperature of 850° C. for 24 hours. After this, the temperature is gradually cooled down to the room temperature. By the aforementioned procedure, it is possible to synthesize $LiMn_2O_2N_2$.

Synthesis of $LiMn_2O_2P_2$

Lithium carbonate ($Li_xCO_3$), manganese oxide ($Mn_2O_3$), and diphosphorous pentoxide ($P_2O_5$) are mixed at a ratio of 1:2: 2 and treated for 12 hours or so in ethanol by a ball mill. After this, this mixture is dried in air at a temperature of 70° C., and then subjected to a temporary baking in an oxygen stream of 500 cc/min at a temperature of 700° C. for 10 hours. After this, the mixture is subjected to a main baking in an oxygen stream of 500 cc/min at a temperature of 850° C. for 24 hours. After this, the temperature is gradually cooled down to the room temperature. By the aforementioned procedure, it is possible to synthesize $LiMn_2O_2P_2$.

The cathode material of the non-aqueous electrolyte secondary cell has been detailed above. As for the other components constituting the non-aqueous electrolyte secondary cell, it is possible to use those which are normally used in this type of non-aqueous electrolyte secondary cell.

For example, as an anode material, carbon materials are used in which lithium ions are inserted and taken out. For example, it is possible to use a conductive polymer such as polyacetylene and polypyrol, or coke, polymer coal, carbon fiber, or if a great energy density per unit volume is considered, pyrocarbon, cokes (petroleum coke, pitch coke, coal coke, and the like), carbon black (acetylene black or the like), vetrified carbon, organic high molecular baked material (organic high molecular material which has been backed in an inactive gas stream or vacuum at an appropriate temperature of 500 C or above), and the like.

Moreover, the organic solvent used as the electrolytic solution is not limited to a particular material, it is possible to use solely or in combination the following materials: propylene carbonate, ethylene carbonate, butylene carbonate, γ-butyl lactone, 1, 2-dimetoxyethane, 1, 2-dietoxyethane, tetrahydrofurane, 2-methyltetrahydrofurane, 1, 3-dioxolan, 4-methyl-1, 3-dioxolan, diglyme, triglyme, sulfolane, dimethyl carbonate, diethyl carbonate, dipropyl carbonate, and the like.

As for the electrolyte, any of the known ones can be used such as $LiClO_4$, $LiAsF_6$, $LiPF_6$, $LiBF_4$, $Lib(C_6H_5)_4$, LiCl, LiBr, $CH_3SO_3Li$, $CF_3SO_3Li$, and the like.

As is clear form the aforementioned, the present invention uses as a cathode material of the non-aqueous electrolyte secondary cell, a lithium compound $Li_xMn_2O_4$ ($0 \leq x \leq 3$) whose oxygen ions are at least partially replaced by negative ions having a greater absolute value than the oxygen ion and accordingly, it is possible to extend the 4V region in comparison to the voltage characteristic of $Li_xMn_2O_4$ and to obtain a preferable voltage characteristic which can compete with the use of $Li_xCoO_2$ as the cathode material. Moreover, this $Li_xMn_2O_4$ has a stable structure compared to $Li_xCoO_2$ and is easily available, thus enabling to provide a lithium ion secondary cell having an excellent reliability at low costs.

What is claimed is:

1. A cathode material comprising a lithium compound $Li_xMn_2O_{4-z}A_z$, wherein A represents a negative ion having a greater absolute value of valence than an oxygen ion and may be a single kind of ion or two or more kinds of ions, and wherein $0 < x \leq 3$ and $0 < z \leq 2$.

2. A cathode material comprising a lithium compound $Li_xMn_2O_4$ (wherein $0 < x \leq 3$) whose oxygen ions are at least partially replaced by negative ions having a greater absolute value of valence than oxygen ions, said negative ions being at least one of a nitrogen ion or a phosphorus ion.

3. A non-aqueous electrolyte secondary cell comprising:
    a cathode including a lithium compound $Li_xMn_2O_4$ (wherein x is in the range of $0<x \leq 3$) whose oxygen ions are at least partially replaced by negative ions having a greater absolute value of valence than oxygen ion, said negative ions being at least one of a nitrogen ion or a phosphorus ion;
    an anode; and
    an electrolyte.

4. A non-aqueous electrolyte secondary cell as claimed in claim 3, wherein the anode is a carbon material in which lithium ions are inserted and taken out.

5. A non-aqueous electrolyte secondary cell as claimed in claim 4, wherein said carbon material is selected from the group consisting of pyrocarbon, coke, carbon black, vetrified carbon, and organic high molecular baked material.

* * * * *